United States Patent [19]
Watanabe et al.

[11] Patent Number: 5,547,488
[45] Date of Patent: Aug. 20, 1996

[54] METHOD OF MAKING EJECTION POWDER FOR MECHANICAL PLATING

[75] Inventors: Masatsugu Watanabe; Yasuhisa Nagano; Hajime Shimoyama; Tomohiro Osaka, all of Okayama, Japan

[73] Assignee: Dowa Iron Powder Co., Ltd., Okayama, Japan

[21] Appl. No.: 312,002

[22] Filed: Sep. 23, 1994

Related U.S. Application Data

[63] Continuation of Ser. No. 17,626, Feb. 12, 1993, abandoned.

[30] Foreign Application Priority Data

Feb. 14, 1992 [JP] Japan .................................. 4-061427

[51] Int. Cl.⁶ ................................................ B22F 9/06
[52] U.S. Cl. ................................................ 75/335; 75/352
[58] Field of Search ............................ 75/332, 335, 352, 75/354

[56] References Cited

U.S. PATENT DOCUMENTS

| | | | |
|---|---|---|---|
| 1,992,548 | 2/1935 | Short | 428/570 |
| 1,992,549 | 2/1935 | Short | 428/570 |
| 2,141,813 | 12/1938 | Finkeldey | 420/513 |
| 4,714,622 | 12/1987 | Omori et al. | 427/192 |
| 4,915,906 | 4/1990 | Champagne et al. | 420/513 |

FOREIGN PATENT DOCUMENTS

| | | | |
|---|---|---|---|
| 170240 | 5/1986 | European Pat. Off. | |
| 55-107703 | 8/1980 | Japan | 75/352 |
| 62-278203 | 12/1987 | Japan | 428/570 |
| 1-149902 | 6/1989 | Japan | 428/570 |

OTHER PUBLICATIONS

Patent abstract of JP 1-283,388, Nov., 1989.

*Primary Examiner*—George Wyszomierski
*Attorney, Agent, or Firm*—Koda and Androlia

[57] ABSTRACT

Ejection material in powder form used in mechanical plating, each particle of the ejection material being made of an iron alloy core covered with a zinc alloy layer and conducted with thermal treatment at a temperature between 300° and 700° C. so that the zinc alloy layer has the Vicker's hardness of 60 to 370.

7 Claims, 2 Drawing Sheets

METHOD OF MAKING EJECTION POWDER FOR MECHANICAL PLATING

This is a continuation of application Ser. No. 08/017,626, filed Feb. 12, 1993 now abandoned.

BACKGROUND OF THE INVENTION

1. Field of the Invention

This invention relates to a newly developed mechanical plating material and a mechanical plating method that uses such a plating material, thus making a zinc alloy film on the surface of a metallic substrate, mainly steel.

2. Prior Art

The conventional mechanical plating method, which forms a zinc film on the surface of metallic substrates or works by ejecting an ejection material which is zinc powder, is known as the galvanizing method. The ejection powders proposed in the prior art are classified into two groups. One is the mixture of steel shot and zinc powder (or zinc particle) as disclosed in British Pat. No. 1041620, and the other is zinc alloy particles each having an iron nucleus as disclosed in the Japanese Patent Application Publication (Kokoku) No. 59-9312. The ejection powder having iron nuclei is superior, because all the ejection powders can participate to form the zinc alloy film. At present, this method is most commonly used.

There are two methods of manufacturing zinc alloy powders having iron nuclei. One is a melting-zinc method in which nuclei of iron alloy (which include not only pure iron but also an iron alloy that contains Ni, Cr, Mn, etc.) is dipped into a zinc alloy melt (which includes not only pure zinc but also a zinc alloy that contains Cu and Al) to form a zinc alloy layer around the iron alloy nucleus. The other method is a zinc penetration method in which iron alloy particles are treated with zinc alloy vapor. In either method, the zinc alloy layer formed around the iron alloy nucleus is composed of several different phases. At the inner most, there is the $\alpha$ (alpha) phase, which is a solid solution of iron alloy and zinc alloy, then there are the $\gamma$ (gamma) phase, the $\delta$ (delta) phase and the $\beta$ (zeta) phase which are metallic compounds of iron alloy and zinc alloy, and then there is the $\eta$ (eta) phase that is a zinc alloy phase. The $\eta$ (eta) phase is located at the outer most of the particle and is very soft, having Vicker's hardness (Hv) ranging from 30 to 60.

When the ejection powder thus obtained is ejected onto metallic works, a zinc alloy film is formed on the surface. It is believed that the film is formed because a part of the zinc alloy layer of the ejection powder is destroyed when the ejection powder collides against the metallic works and stay on the surface of the metallic works. Accordingly, the easily destructive nature of the zinc alloy layer of the ejection powder is a significant factor for a zinc alloy film to form on the surface of metallic works. On the other hand, if the zinc alloy phase is too soft, it is difficult to destroy, and the zinc alloy film does not form on the metallic works.

SUMMARY OF THE INVENTION

The present invention is to solve the problems in the prior art.

The inventors found that when a suitable thermal treatment is conducted to the ejection material (or ejection powder) that is coated with a zinc alloy layer surrounding the iron alloy nucleus, the hardness of the zinc alloy layer can increase. In addition, the structure of the zinc alloy layer can become uniform via such a thermal treatment. The present invention is based on these findings.

Thus, the present invention provides ejection powder used for mechanical plating with its Hv hardness of the zinc alloy layer adjusted between 60 to 370 via a thermal treatment performed on the ejection powder which is iron nuclei or iron alloy nuclei coated with zinc alloy layers.

The ejection powder of the present invention is prepared by conducting a thermal treatment to the ejection powder which is produced by mixing the iron alloy particle of a suitable size with a zinc alloy melt under agitation. Zinc alloys suitable for accomplishing the purpose of the present invention are those that contain Zn and, as a main element, 1 to 20 wt % of Fe or Ni and further, as minor elements, 1 to 15 wt % of other substances such as Al, Sn, Mg and Pb. The Vicker's hardness, Hv, of the zinc alloy layer of the ejection powder of the present invention is set so as to be between 60 and 370. This hardness range is particularly desirable for the formation of a zinc alloy film on the surface of metallic works. Outside of this Hv range, the zinc alloy film cannot be formed at its most sufficient level. The hardness range described above can be obtained by the thermal treatment conducted to the ejection powder at a temperature of 300° to 700 ° C. for 5 to 30 minutes.

With the thermal treatment as described above, the zinc alloy layer formed on the iron or iron alloy nucleus can be uniform in structure and can increase its hardness. Due to the synergistic effect of these factors, the ejection powder is readily destroyed when it collides with the surface of metallic works, and as a result, the adhesion efficiency is enhanced. On the other hand, the resulting zinc alloy film thus formed on the metallic surface has a high level of Hv hardness; as a result, the destruction of the zinc alloy layer of the ejection powder that is successively applied onto the formed zinc alloy film can be accelerated so that a thicker zinc alloy film is formed on the surface of the metallic works. Since the hardness of the thus formed zinc alloy film is high, an excellent adherence to the surface of the metallic works is obtained. At the same time, the zinc alloy film can stay firmly on the surface of the metallic works.

DETAILED DESCRIPTION OF THE INVENTION

A zinc alloy melt comprising 96.5 wt % of Zn and 3.5 wt % of Al is kept at the temperature of 500°±5° C. and mixed with iron alloy particles having the diameter of 355 to 180 µm and comprising 96.9 wt % of Fe, 1.0 wt % of C, 0.9 wt % of Si, 0.2 wt % of O (impurity), and 1.0 wt % of Mn at a ratio of 1:1, and then agitated for 20 minutes. Upon cooling to room temperature, the solidified alloy is subject to being crushed in order to obtain ejection powder (or ejection material) of a size between 710 and 250 µm. Thermal treatment is conducted to the ejection powder (or ejection material) thus obtained. More specifically, the ejection powder is heated at a temperature between 300° and 700° C. for ten (10) minutes either in an inert or open atmosphere containing a small amount of oxygen. The characteristics of the ejection powder is examined for the following two aspects:

(1) Relationship Between the Treatment Temperature and the Hardness of Zinc Alloy Layer Each particle of the ejection powder treated at the temperature and time period described above was cemented in an acrylic resin, and the cemented specimen was polished until the cross-sectional size became almost the same as the particle size. After the polishing, the average Vicker's hardness (Hv) of the zinc alloy layer obtained at different thermal treatment temperatures was measured by a micro hardness tester. The test result is shown in the table below. As is clear from the table, the higher treatment temperature results in a higher Hv hardness.

TABLE

| Treatment Temperature (°C.) | 300 | 400 | 500 | 600 | 700 |
|---|---|---|---|---|---|
| Average Hv Hardness | 100 | 140 | 200 | 300 | 490 |

Figure 1:
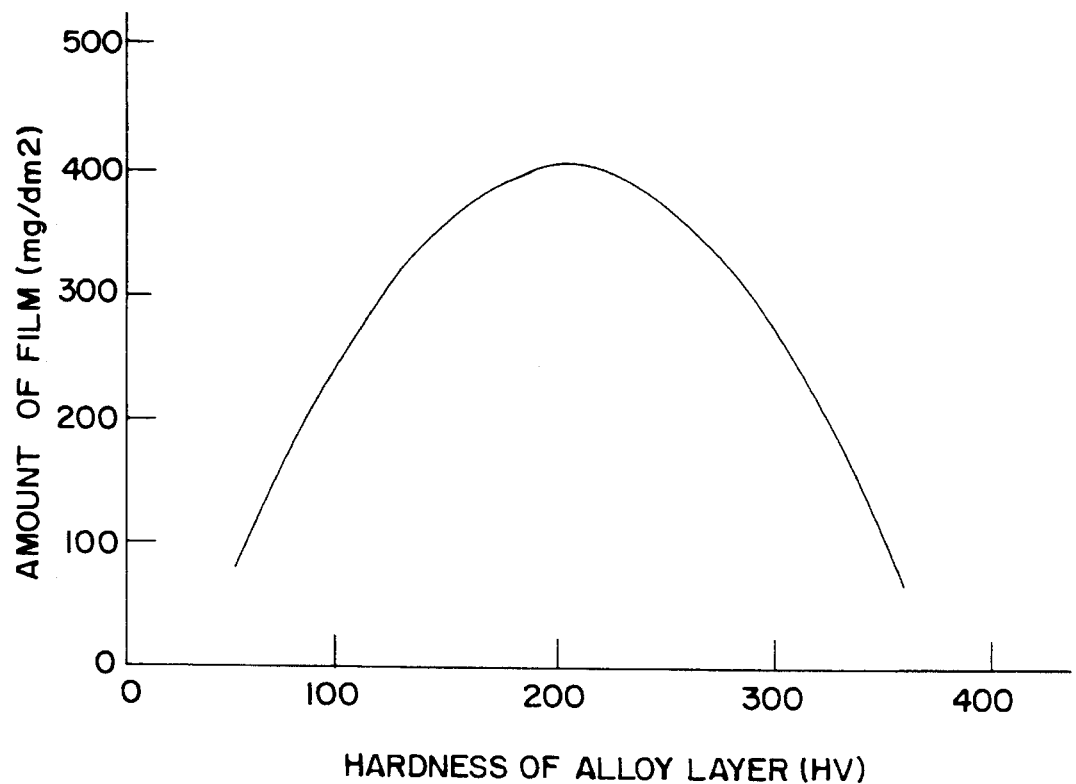
FIG. 1 is a graph showing the relationship between the hardness of the alloy layer and the amount of film formed by the ejection powder according to the present invention.

(2) Relationship Between the Hv Hardness of the Zinc Alloy Layer of the Ejection Powder and the Amount of Film Formed The mechanical plating was performed under the conditions described below, and the amount of zinc alloy film formed on the surface of the test piece was measured. The result is shown in FIG. 1.

Equipment Used: Air blaster (Pressure=5 Kg/cm2)

Amount of Ejection: 500 g

Ejection Distance: 145 mm

Test Piece: S45C, 20 mm×20 mm×2.3 mm

Measurement of the amount of film formed:

Amount of film (mg/dm2)=(W1−W2)/S, wherein,
W1: Weight of test piece after mechanical plating
W2: Dry weight of test piece after eliminating the film with 20% NaOH solution at 80° C.
S: Surface area of the test piece As seen from FIG. 1, the amount of film linearly increases in proportion to the increase in Hv hardness in the range of 60 to 200 and then linearly decreases beyond the hardness value of 200. From this, it is clear that the amount of film can be controlled by adjusting the hardness of the zinc alloy layer. It is also clear that the average Hv hardness of approximately 200 is the most desirable to obtain the maximum amount of film.

Figure 2:
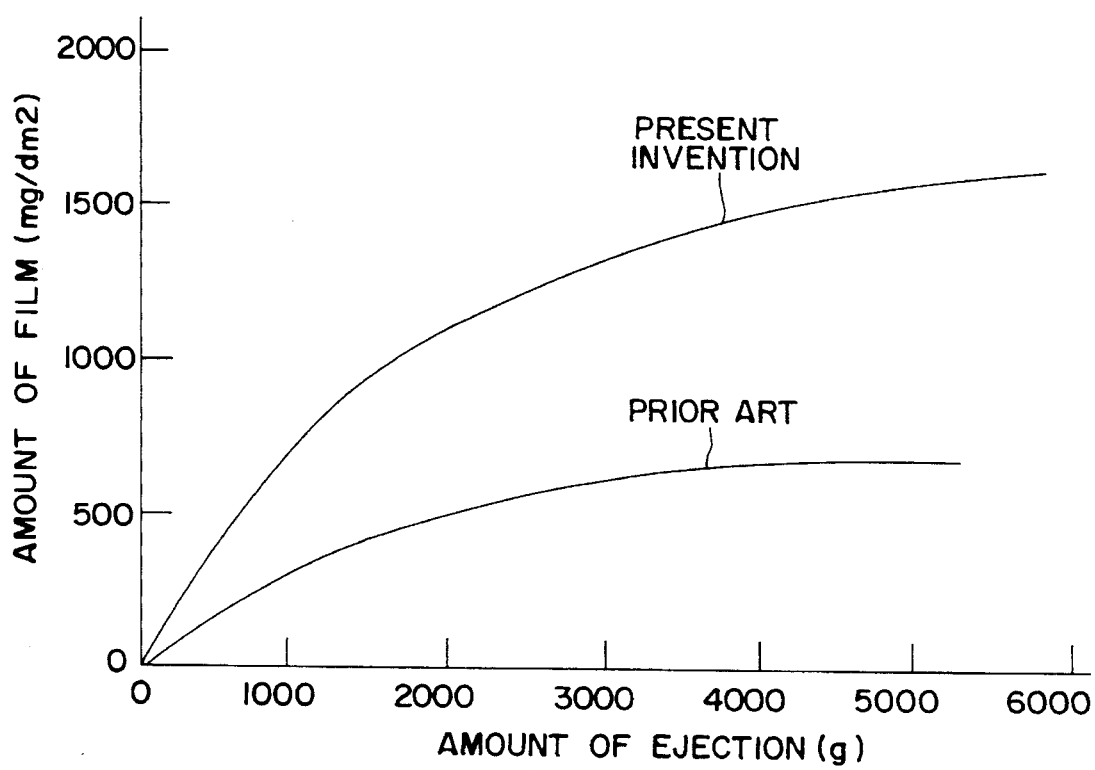
FIG. 2 is a graph showing the relationship between the amount of ejection and the amount of film formed by the ejection powder of the present invention and prior art.

FIG. 2 shows the relationship between the amount of ejection of the ejection powder and the amount of film formed. In this case, the ejection powder having the Hv hardness of 200 was used. This ejection powder is obtained by treating (or heating) the ejection powder, which is obtained as described above, at 500° C. for ten (10) minutes, and the mechanical plating was performed under the conditions described above (2) with the use of the thus obtained ejection powder. For a comparative purpose, the relationship between the amount of ejection and the amount of film formed by the ejection powder upon which no thermal treatment was conducted is also shown in FIG. 2 as a prior art.

Figure 3:
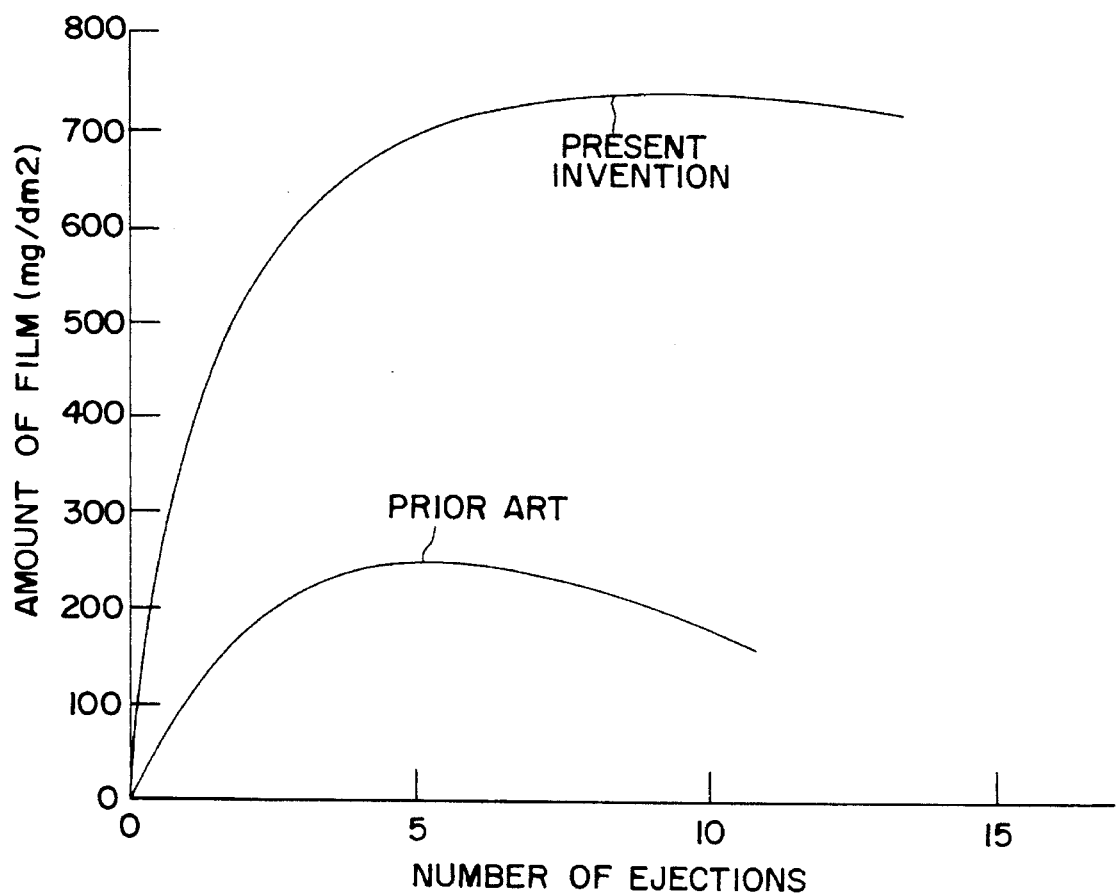
FIG. 3 is a graph showing the relationship between the number of ejections and the amount of film formed by the ejection powder of the present invention and prior art.

In addition, the result obtained by the examination of the relationship between the number of ejections and the amount of film formed is shown in FIG. 3. For a comparative purpose, the relationship between the number of ejections and the amount of film formed by the ejection powder upon which no thermal treatment was conducted is also shown in FIG. 3 as a prior art.

As is obvious from FIG. 2, the amount of film increases in proportion to the increase in the amount of ejection of the ejection powder in the present invention. However, in the prior art ejection powder with no thermal treatment thereon, the amount of film is at its maximum when about 3000 g of ejection powder is used, and then it would not increase even though more than 3000 g of ejection powder is used. The reason for this is assumed as follows: The hardness of the ejection powder with no thermal treatment thereon (that is the prior art ejection powder) is low and its structure is not uniform; as a result, the amount of film formed at an early ejection stage can increase, for some extent, in proportion to the hardness of the zinc alloy layer. However, the growth of the film suddenly declines when it comes to the stage in which a new film is formed on the previously formed film. This is because the ejection energy is absorbed by the soft zinc alloy layer of the non-thermal treatment ejection powder; as a result, the zinc alloy layer of the ejection powder is not destroyed, and the increase in the film to be formed on the surface of the metallic works is hindered.

Furthermore, as seen from FIG. 3, the amount of the zinc alloy film formed by the ejection powder of the present invention can reach its maximum value at around the 10th ejection, while the amount of zinc alloy film formed by the ejection powder with no thermal treatment thereon starts decreasing after the 5th ejection. This fact indicates that the zinc alloy layer of the ejection powder with no thermal treatment thereon is poorer in structure than that with thermal treatment. More specifically, in the ejection powder with no thermal treatment thereon, the zinc alloy layer can easily be separated from the iron alloy nucleus when the powder is ejected, because in such ejection powder, the iron alloy nucleus and the surrounding zinc alloy layer cannot be sufficiently alloyed together. As a result, the iron alloy nucleus which has no zinc alloy layer breaks the formed zinc alloy film, decreasing the amount of film formed.

In view of the description above, it is readily understood that a thicker zinc alloy film can be formed on the surface of metallic works with the use of the ejection powder of the present invention. In other words, with the use of the ejection powder of the present invention, the number of ejections for forming a zinc alloy film of a desired thickness can be less, and a smaller amount of ejection powder is required than in the prior art. The zinc alloy film formed on metallic works by the ejection powder of the present invention is superior in an exfoliate nature and its durability excels as well.

We claim:

1. A method of making ejection powder for mechanical plating comprising the steps of:

forming a zinc alloy melt comprising 96.5 wt % of zinc and 3.5 wt % of aluminum;

mixing iron alloy particles of a diameter of 180– 355 micrometers and comprising 96.9 wt % of iron, 1.0 wt % of carbon, 0.9 wt % of silicon, 1.0 wt % of magnesium and 0.2 wt % impurity at a ratio of 1:1 into said zinc alloy melt;

agitating said mixture of zinc alloy melt and iron alloy particles for 20 minutes;

cooling said agitated mixture to a room temperature to solidify said mixture into a sold alloy;

crushing said solid alloy to form a powder of a size between 210 and 710 micrometers;

heating said powder to a temperature of 300°–700° C.; and keeping said powder at said temperature for 5–30 minutes;

whereby an ejection powder of an average Vicker's hardness between 60 and 370 is formed.

2. A method according to claim 1, wherein said heating step comprises heating said powder in an inert atmosphere.

3. A method according to claim 1, wherein said heating step comprises heating said powder in an open atmosphere containing a small amount of oxygen.

4. A method according to claim 1, wherein said zinc alloy melt is formed at a temperature of substantially 500° C.

5. A method of making ejection powder for mechanical plating comprising the steps of:

forming a zinc alloy melt;

mixing iron alloy particles into said zinc alloy melt;

agitating said mixture of zinc alloy melt and iron alloy particles;

cooling said agitated mixture to room temperature to solidify said mixture into a solid alloy;

crushing said solid alloy to form a powder;

heating said powder to a temperature of 300°–700° C.;

and keeping said powder at said temperature for 5–30 minutes;

whereby an ejection powder of an average Vicker's hardness between 60 and 370 is formed.

6. A method according to claim 5, wherein said heating step comprises heating said powder in an inert atmosphere.

7. A method according to claim 5, wherein said heating step comprises heating said powder in an open atmosphere containing a small amount of oxygen.

* * * * *